United States Patent [19]
Chen et al.

[11] Patent Number: 5,937,663
[45] Date of Patent: Aug. 17, 1999

[54] MULTIPURPOSE HEAT PUMP SYSTEM

[75] Inventors: Tsai-Chi Chen; Sih-Li Chen, both of Taipei, Taiwan

[73] Assignee: Yang Fan Development Co., Ltd., Taipei, Taiwan

[21] Appl. No.: 08/997,237

[22] Filed: Dec. 23, 1997

[51] Int. Cl.[6] .................................................. F25B 27/00
[52] U.S. Cl. ................................. 62/238.7; 62/324.6
[58] Field of Search .......................... 62/238.7, 324.1, 62/324.6, 238.6; 126/400

[56] References Cited

U.S. PATENT DOCUMENTS

| | | | |
|---|---|---|---|
| 3,017,162 | 1/1962 | Haines et al. | 62/238.6 |
| 4,027,821 | 6/1977 | Hayes et al. | 126/400 |
| 5,003,788 | 4/1991 | Fischer | 62/238.7 |
| 5,243,825 | 9/1993 | Lin | 62/238.7 |
| 5,558,273 | 9/1996 | Swenson et al. | 62/238.7 |
| 5,632,442 | 5/1997 | Misawa et al. | 62/238.7 |

*Primary Examiner*—William E. Tapolcai
*Attorney, Agent, or Firm*—Bacon & Thomas, PLLC

[57] ABSTRACT

Disclosed is a multipurpose heat pump system including a heat pump unit using air as a heat source, a heat recovery heat exchanger, and a heat storage. Refrigerant in the heat pump unit can be guided to flow through different paths defined by a four-way valve of the heat pump unit, so that the heat pump unit can operate in different modes depending on actual needs to produce cold/hot water for air conditioning and/or hot water for daily use. Heat generated during a refrigerant compression in the heat pump unit can be recovered for heating water in the heat storage. Stratified hot water is stored in the heat storage and can be supplied for daily use.

11 Claims, 11 Drawing Sheets

MULTIPURPOSE HEAT PUMP SYSTEM

BACKGROUND OF THE INVENTION

The present invention relates to a multipurpose heat pump system which may supply cold water for air conditioning in summer and hot water for air conditioning in winter, as well as hot water needed in daily life, for example, for dish washing and bathing, etc. via different circulation combinations and operations. Such heat pump system not only meets needs in different seasons, but also increases energy utilization efficiency. The heat pump system is also helpful in environmental protection.

For areas in subtropics, such as Taiwan, researches concerning air conditioning generally focus on the indoor cooling effect rather than the heat pump system for supplying heat energy. It can be found from general users in Taiwan that most heat pump systems have very low rate of use in winter, some of them are even completely shut down and the equipment is idle.

When a heat pump system is in the process of refrigerating operation, refrigerant in the form of low pressure vapor is compressed by a compressor into a high-pressure overheated vapor which is then discharged into the atmosphere by way of air cooling through a condenser and results in a greenhouse effect in surrounding environment. If heat so produced can be recovered for use in supplying hot water, not only the condensing pressure required by the condenser can be reduced, the coefficient of performance (COP) of the heat pump system can also be upgraded. Moreover, an increased energy utilization efficiency can be achieved and a negative influence of the high temperature of the discharged vapor on the environment can be reduced.

When a gas heater or an electrical heater is used to produce hot water, only a low heat energy per unit cost can be obtained while there is risk of gas poisoning or electric leakage. The safety in use of these heaters is therefore very low.

SUMMARY OF THE INVENTION

It is therefore a primary object of the present invention to provide a heat pump system which can be used to supply cold/hot water required in air conditioning and/or hot water needed in daily life, depending on the needs in different seasons, so that a high energy utilization efficiency and a prolonged usable life of the equipment can be achieved.

Another object of the present invention is to provide a heat pump system to increase the energy utilization efficiency. To achieve this object, the heat pump system includes a heat recovery heat exchanger and a heat storage. When the heat pump system is in the process of refrigerating operation, refrigerant in the form of low pressure vapor is compressed by a compressor into a high-pressure overheated vapor which is then recovered and transformed into hot water and be stored in the heat storage for use later.

A further object of the present invention is to provide a heat pump system which is mounted outdoors without occupying any indoor space, and therefore, noise produced by the operating system, especially by the compressor thereof, will not adversely affect the indoor activities.

A still further object of the present invention is to provide a heat pump system in which the same one refrigerant pipeline is used by the air conditioner and the water for daily use to allow a reduced volume and an increased rate of utilization of the system.

To achieve the above and other objects, there is provided a multipurpose heat pump system which is based on a general air conditioning heat pump equipment to which a heat recovery heat exchanger and a heat storage are connected by mounting them below a heat pump unit using air as a heat sourace. The heat pump system includes an upper portion which is an air-cooled heat exchanger, a middle portion which is a machine chamber for a heat pump unit, and a lower portion which is a heat storage. With this arrangement, the heat pump system can supply cold and hot water for air conditioning as well as hot water for daily use. This enables the system to be highly utilized and create a highly added value of the system. High maintenance costs and shortened usable life due to long term of shutdown of the system in the winter can also be avoided.

DETAILED DESCRIPTION OF THE PREFERRED EMBODIMENTS

Figure 1:
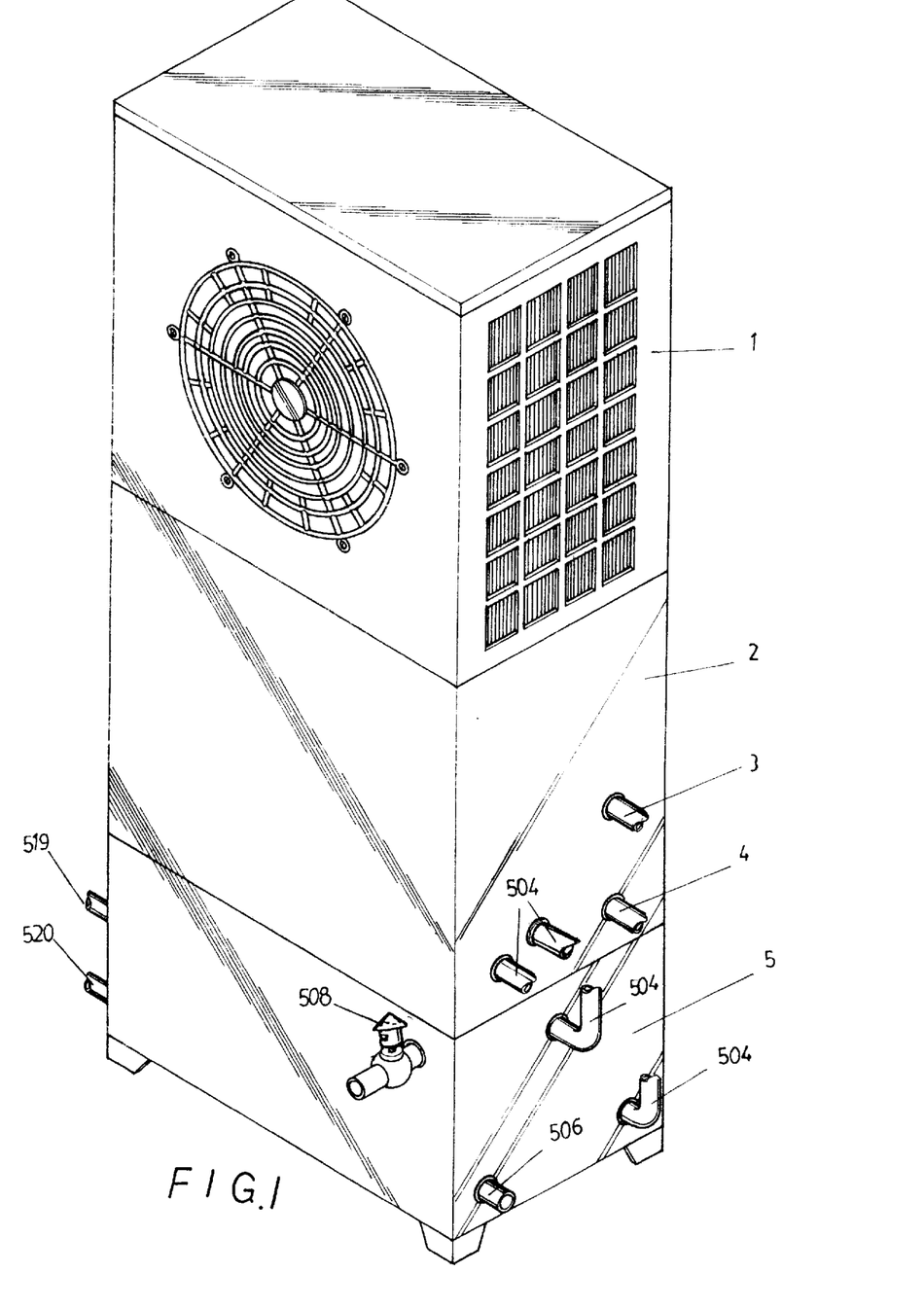
FIG. 1 is a perspective view of a multipurpose heat pump system according to the present invention.
Figure 2:
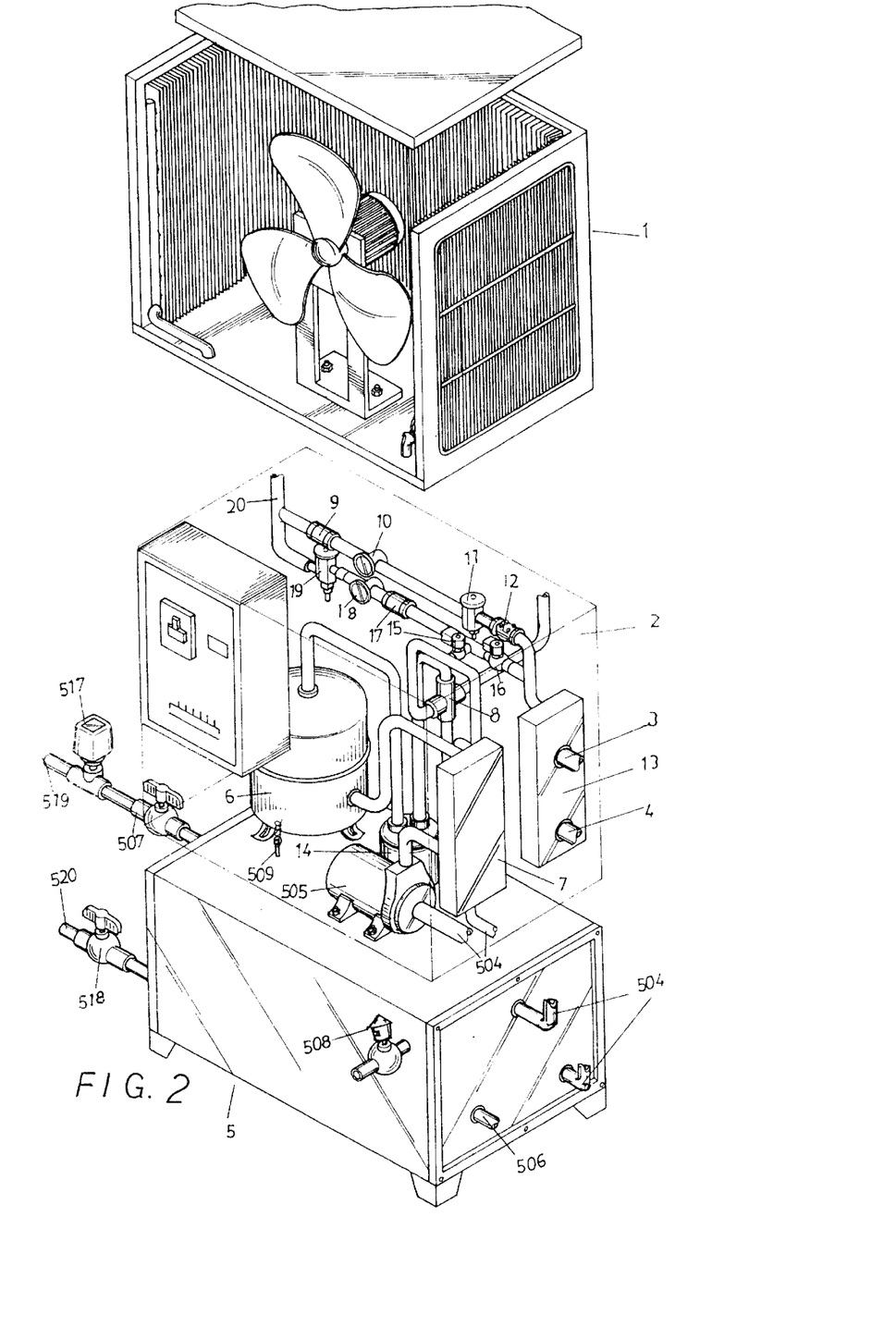
FIG. 2 is a perspective view showing the internal structure of the heat pump system of the present invention.

Please refer to FIGS. 1 and 2. The multipurpose heat pump system according to the present invention is based on a general air conditioning heat pump equipment to which a heat recovery heat exchanger and a heat storage are connected by mounting them below a heat pump unit using air as a heat sourace. As shown in FIG. 1, the heat pump system includes an upper portion which is an air-cooled heat exchanger 1, a middle portion which is a machine chamber 2 of the heat pump system, and a lower portion which is a heat storage 5. With this arrangement, the heat pump system can supply cold and hot water for air conditioning as well as hot water for daily use.

From FIG. 2, it can be seen that some basic elements in the machine chamber 2 include a compressor 6, a heat recovery heat exchanger 7, a four-way valve 8, a first drying filter 9, a first inspection window 10, a first expansion valve 11, a check valve 12, a heat exchanger 13, a knock-out drum 14, a first electromagnetic valve 15, a second electromagnetic valve 16, a second drying filter 17, a second inspection window 18, a second expansion valve 19, and a full set of refrigerant pipeline 20.

Figure 3:
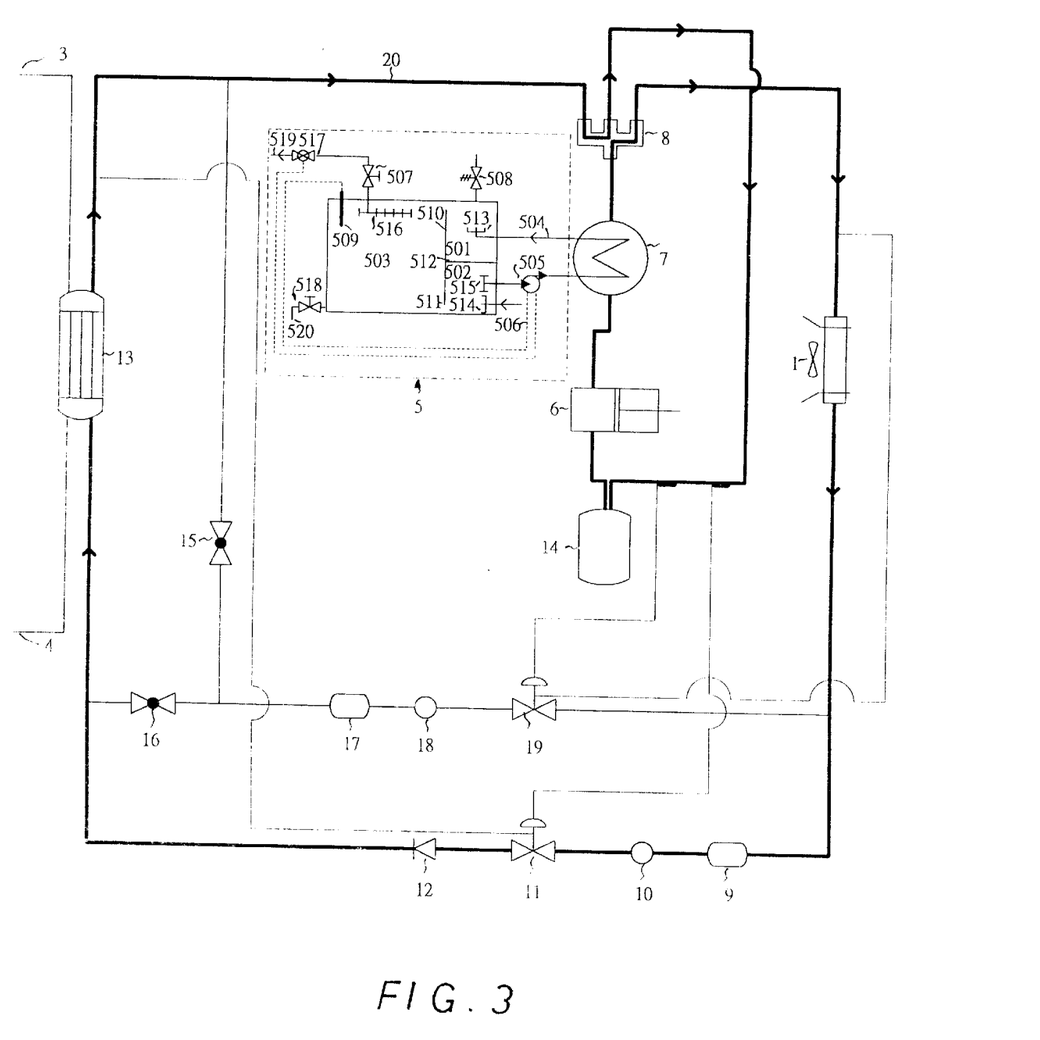
FIG. 3 is a diagram showing a first mode of summer refrigerant circulation system provided by the present invention.

With the structure illustrated in FIGS. 1 and 2, the heat pump system of the present invention may provide six different operation modes to meet different needs in different seasons:

A. Summer Mode 1 for supplying cold water for air conditioning and hot water for daily use:

Please refer to FIG. 3 for the circulation of refrigerant in this first summer mode operation. As shown, a current of low-temperature and low-pressure gaseous refrigerant is compressed by the compressor 6 in the machine chamber 2 into a high-temperature and high-pressure overheated gaseous refrigerant which and water from the heat storage 5 exchange heat in the heat recovery heat exchanger 7, so that a part of heat energy in the overheated gaseous refrigerant can be recovered. The operation and function of the heat storage 5 will be further discussed later. At this point, the high-temperature and high-pressure refrigerant in the form of mixed liquid and vapor flows through the four-way valve 8 which has been switched to a summer cooling side, so that the refrigerant flows into the air-cooled heat exchanger 1 and is condensed into a high-pressure and low-temperature liquid refrigerant. Meanwhile, a temperature-sensing ball of the second expansion valve 19 in the machine chamber 2 is located at a low-pressure side in front of the knock-out drum 14. On the other hand, an external equalizing line is connected to a high-pressure side in front of the air-cooled heat exchanger 1. That is, the second expansion valve 19 is closed now and the refrigerant can only flow through the first drying filter 9 and the first inspection window 10 in the machine chamber 2 to be expanded in the first expansion valve 11 to a two-phase low-pressure refrigerant before it flows through the check valve 12. At this point, both the first and the second electromagnetic valve 15, 16 are set to OFF. Thus, the refrigerant will flow toward the heat exchanger 13 to proceed heat exchange with water flowing into the heat exchanger 13 via an air-conditioning cold/hot water inlet 4, so as to produce cold water needed by the air conditioning. The produced cold water for air conditioning flows out from an air-conditioning cold/hot water outlet 3. At this point, the refrigerant is already in a low-temperature and low-pressure state and flows through the refrigerant pipeline 20 to pass another two openings of the four-way valve 8 and flows into the knock-out drum 14, so that low-pressure and low-temperature gaseous refrigerant is separated from the liquid refrigerant and returns to the compressor 6 to complete a whole refrigerant circulation cycle.

Figure 4:
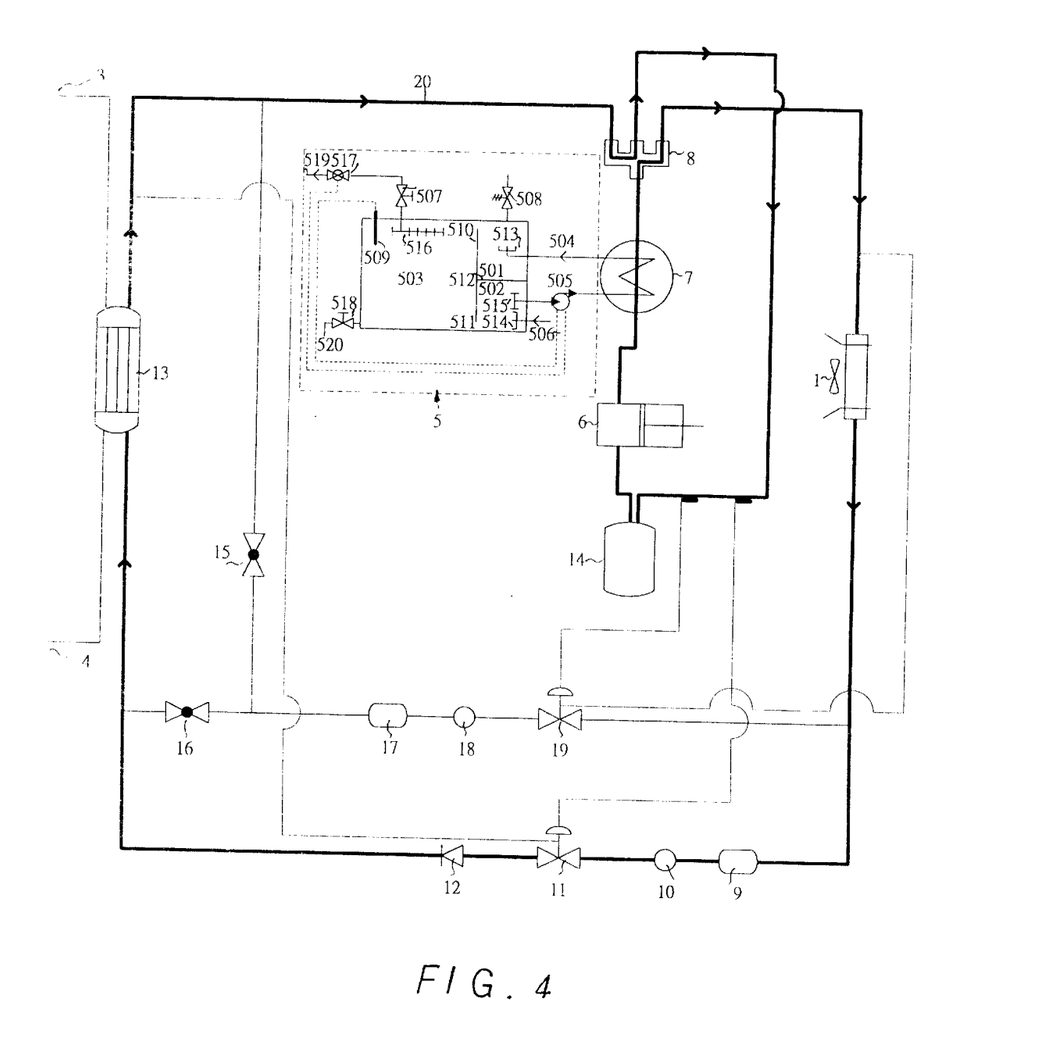
FIG. 4 is a diagram showing a second mode of summer refrigerant circulation system provided by the present invention.

B. Summer Mode 2 for supplying only cold water for air conditioning purpose; no hot water for daily use is supplied:

Please refer to FIG. 4 for the refrigerant circulation in this second summer mode operation. This second summer mode operation is generally similar to the first summer mode operation, except that the refrigerant produces cold water in the heat exchanger 13 for air conditioning use and the heat recovery heat exchanger 7 is closed and does not produce hot water for daily use. At this point, the air-cooled heat exchanger 1 is the only part of the system to take over all the heat of condensation that must be discharged by the system.

Figure 5:
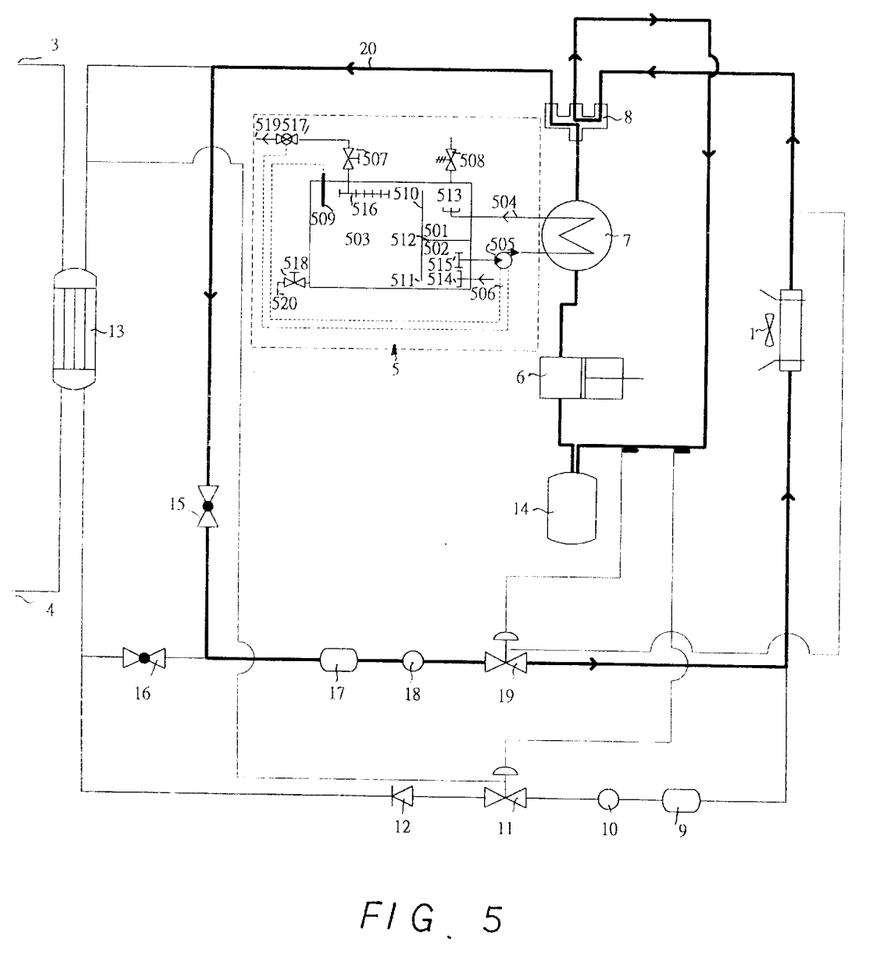
FIG. 5 is a diagram showing a third mode of summer refrigerant circulation system provided by the present invention.

C. Summer Mode 3 for supplying only hot water for daily use; no cold water for air conditioning purpose is supplied:

Please refer to FIG. 5 for the refrigerant circulation in this third summer mode operation. In this third summer mode operation, after the high-pressure and high-temperature overheated gaseous refrigerant come out of the compressor 6 has proceeded heat exchange in the heat recovery heat exchanger 7, the four-way valve 8 is switched to a winter heating side. At this point, since the first electromagnetic valve 15 is switched on and the second electromagnetic valve 16 is switched off, and there is the check valve 12 mounted on the other pipeline, the refrigerant can only flow through the refrigerant pipeline 20 to pass the first electromagnetic valve 15, the second drying filter 17, and the second inspection window 18, and expands in the second expansion valve 19 to become a low-pressure and low-temperature two-phase refrigerant. At this point, a temperature-sensing ball of the first expansion valve 11 is located at the low pressure side in front of the knock-out drum 14, and an external equalizing line is connected to the high pressure side in front of the heat exchanger 13. So, the first expansion valve 11 is now closed. The air-cooled heat exchanger 1 functions like an evaporator to absorb external heat. And the heat exchanger 13 does not operate.

Figure 6:
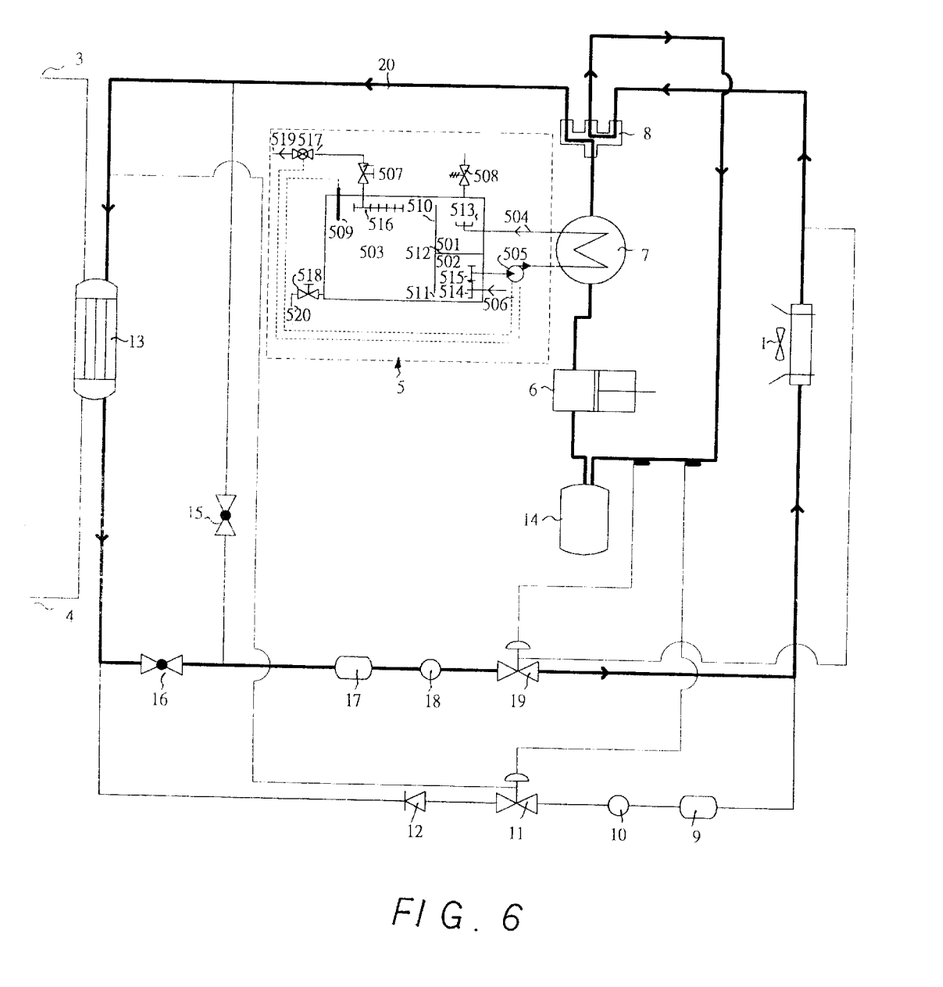
FIG. 6 is a diagram showing a first mode of winter refrigerant circulation system provided by the present invention.

D. Winter Mode 1 for supplying hot water for air conditioning purpose and hot water for daily use:

Please refer to FIG. 6 for the refrigerant circulation in this first winter mode operation. In this first winter mode operation, low-temperature and low-pressure gaseous refrigerant is compressed by the compressor 6 into high-temperature and high-pressure overheated gaseous refrigerant which and water from the heat storage 5 exchange heat in the heat recovery heat exchanger 7, so that a part of heat energy in the overheated gaseous refrigerant can be recovered. At this point, the high-temperature and high-pressure refrigerant in the form of mixed liquid and vapor flows through the four-way valve 8 which has been switched to the winter heating side. In this mode, the first electromagnetic valve 15 is set to OFF. Thus, the refrigerant shall flow through the heat exchanger 13 to proceed heat exchange with water flowing into the heat exchanger 13 via the air-conditioning cold/hot water inlet 4, so as to produce hot water needed by the air conditioning. The produced hot water for air conditioning flows out from the air-conditioning cold/hot water outlet 3. At this point, the refrigerant is already condensed to a high-pressure and low-temperature liquid refrigerant. Since the second electromagnetic valve 16 is set to ON, and the check valve 12 prevents the refrigerant from flowing in a reverse direction, the high-pressure and low-temperature liquid refrigerant shall flow through the second electromagnetic valve 16, the second drying filter 17, and the second inspection window 18 and expands in the second expansion valve 19 to a two-phase low-pressure refrigerant. The temperature-sensing ball of the first expansion valve 11 is located at the low pressure side in front of the knock-out drum 14, and the external equalizing line is connected to the high pressure side in front of the heat exchanger 13. So, the first expansion valve 11 is closed now. The two-phase low-pressure refrigerant flowing out of the second expansion valve 19 can only flow toward the air-cooled heat exchanger 1 to absorb heat from the atmosphere, so as to evaporate into a low-pressure gaseous refrigerant which passes the four-way valve 8 and the knock-out drum 14 and finally returns to the compressor 6, completing a whole refrigerant circulation cycle in the heat pump operation.

Figure 7:
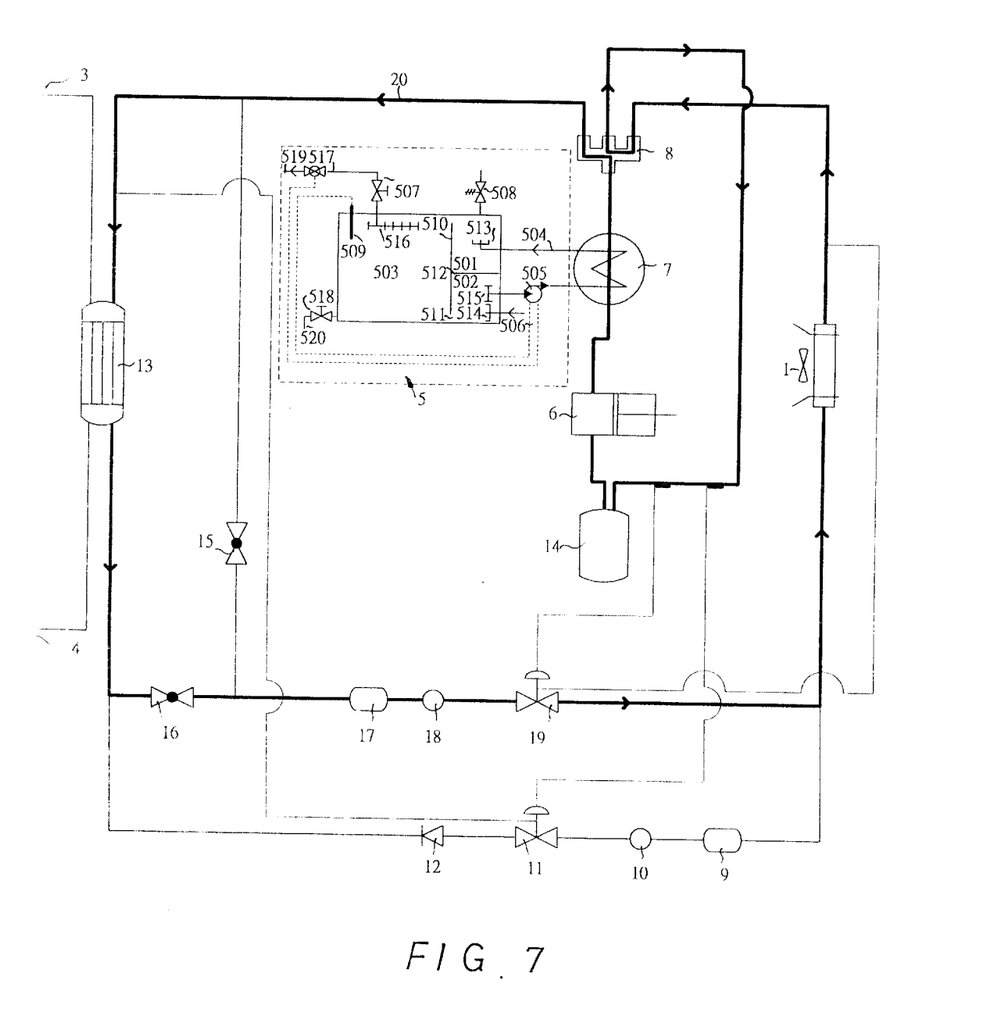
FIG. 7 is a diagram showing a second mode of winter refrigerant circulation system provided by the present invention.

E. Winter Mode 2 for supplying hot water for air conditioning; no hot water for daily use is supplied:

Please refer to FIG. 7 for the refrigerant circulation in this second winter mode operation. This second winter mode operation is generally similar to the first winter mode operation in that the refrigerant produces hot water in the heat exchanger 13 for air conditioning use. However, the heat recovery heat exchanger 7 is closed and does not produce hot water for daily use.

Figure 8:
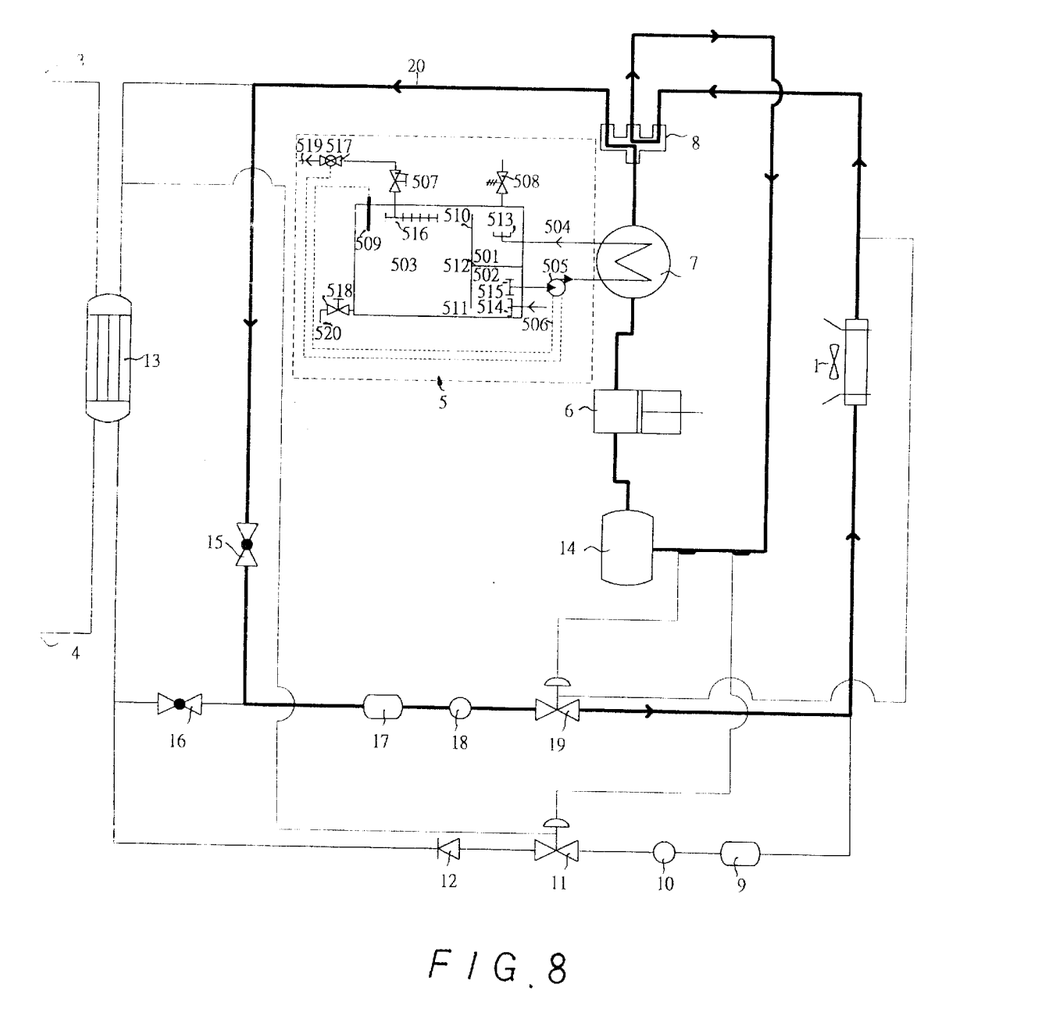
FIG. 8 is a diagram showing a third mode of winter refrigerant circulation system provided by the present invention.

F. Winter Mode 3 for supplying only hot water for daily use; no hot water for air conditioning is supplied:

Please refer to FIG. 8 for the refrigerant circulation in this third winter mode operation. This third winter mode operation is similar to the third summer mode operation in that only the heat recovery heat exchanger 7 and the heat storage 5 are used to produce hot water from recovered heat for daily use; the heat exchanger 13 does not operate and the air-cooled heat exchanger 1 absorbs external heat.

Figure 9:
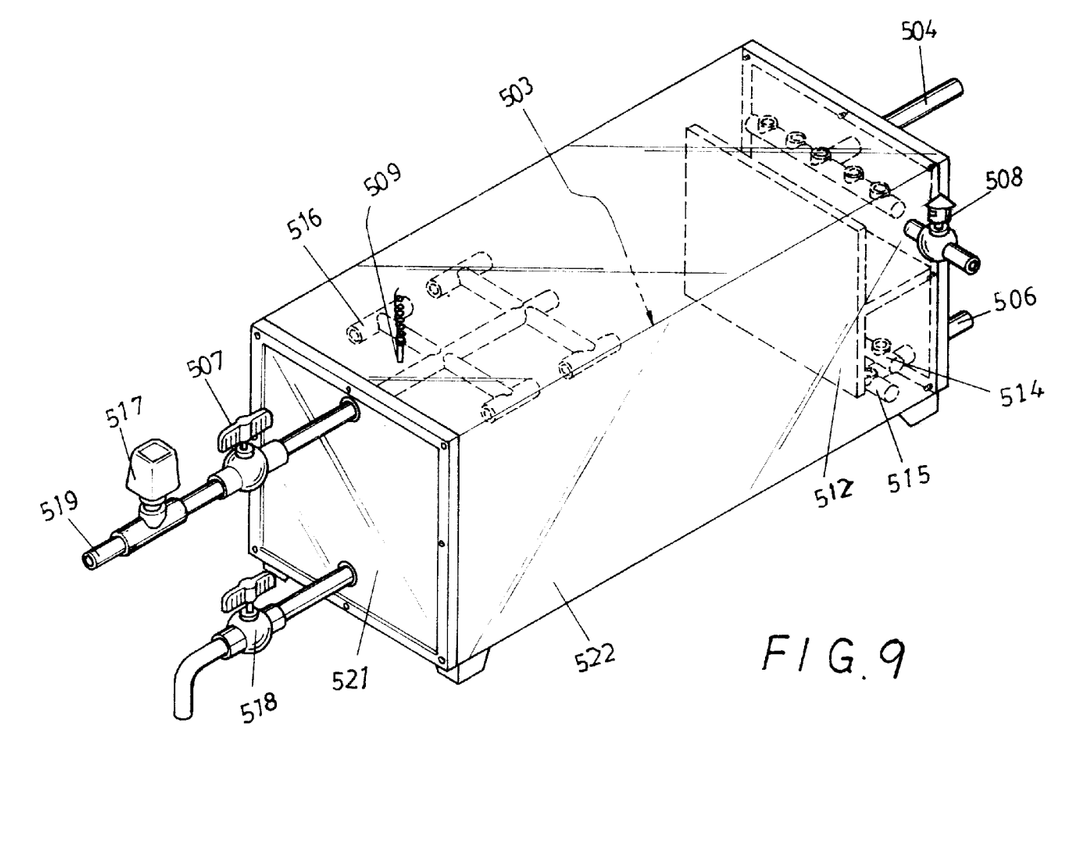
FIG. 9 is a top perspective view showing the internal structure of the heat storage according to the present invention.

Please now refer to FIG. 9 which explains the operation and function of the heat storage 5. The whole heat storage 5 is divided into three spaces, namely, high-temperature mixing chamber 501, room-temperature mixing chamber 502, and thermal stratification chamber 503.

Water in the room-temperature mixing chamber 502 has lower temperature. Replenished cool water flows into the room-temperature mixing chamber 502 via replenished cold water pipe distribution heads 514 located at a lower portion of the chamber 502 to mix with warm water already in the chamber 502. The mixed water is pumped by a hot water circulation pump 505 in the machine chamber 2 via a suction inlet 515 of the pump 505 and is sent to the heat recovery heat exchanger 7 for heating. The heated water enters the high-temperature mixing chamber 501 via hot-water pipe distribution heads 513 and mixes with hot water already in the chamber 501. The mixed hot water flows into the thermal stratification chamber 503 via a high-temperature water passage 510 communicating upper portions of the chamber 503 and the chamber 501. The chamber 503 is also communicable with the room-temperature mixing chamber 502 via a room-temperature water passage 511 provided between lower portions of the chambers 503 and 502, so that cool water in the chamber 502 may flow into the chamber 503 via the lower passage 511. Due to different densities of water of different temperatures, stratified water exists in the chamber 503 to show high, middle, and low temperatures from top to bottom. And since the two passages 510 and 511 have considerably large sectional areas, water flowing into and out of the thermal stratification chamber 503 via these two passages 510, 511 moves at a very low speed without destroying the stratification of water in the chamber 503.

Hot water outlet distribution heads 516 are provided at a top portion of the chamber 503 to supply hot water of higher temperature from the chamber 503. A hot water flow regulating valve 507 is connected to the hot water outlet distribution heads 516 to regulate water amount flowing out of the heads 516 depending on actual need. A flow switch 517 is mounted on a hot water supplying pipe 519 to sense hot water flow in the pipe 519. When a low hot water flow is detected, a control signal is sent by the flow switch 517 to the hot water circulation pump 505 for the latter to stop operating.

The three chambers 501, 502, and 503 of the heat storage 5 are separated from one another by a partition board 512. A temperature sensor 509 is mounted on the heat storage 5 to detect water temperature near an outlet of the chamber 503. When a preset high or low limit of temperature is reached, a control signal is sent by the temperature sensor 509 to the hot water circulation pump 505 to start or close the same. However, when the heat pump system of the present invention is in an operation mode of not recovering heat to supply hot water for daily use, the temperature sensor 509 does not work. This will prevent the hot water circulation pump 505 from unnecessary operating when the water in the heat storage 5 has a temperature lower than the preset low limit due to a natural heat dissipation. The hot water circulation pump 505 is used to transfer water in the heat storage 5 to the heat recovery heat exchanger 7 for being heated in the heat recovery heat exchanger 7, so that a predetermined water temperature in the heat storage 5 can be maintained.

An exhaust valve 508 is connected to the high-temperature mixing chamber 501 for exhausting air in the heat storage 5, so that the whole heat storage 5 is filled with water. When cold water is fed into the heat storage 5, the high-temperature mixing chamber 501 is the last place in the heat storage 5 to be filled with water. Air in the heat storage 5 will be collected and gathered in the upper portion of the chamber 501 and be discharged from the exhaust valve 508.

A replenished water pipe 506 extends into a lower portion of the heat storage 5 to connect with the replenished cold water pipe distribution heads 514 in the room-temperature mixing chamber 502. And, a heat recovery hot water pipe 504 extends into the heat storage 5 from the upper portion of the heat storage 5 to connect with the hot water pipe distribution heads 513 in the high-temperature mixing chamber 501. The purpose for pipes 506 and 504 to connect with the distribution heads 514 and 513, respectively, is to increase the sectional areas of water outlets provided by pipes 506 and 504, so as to reduce the flowing speed of water in pipes 506, 504 to avoid jet stream. The increased sectional areas of water outlets may also enhance the water mixing effect in the heat storage 5.

Figure 10:
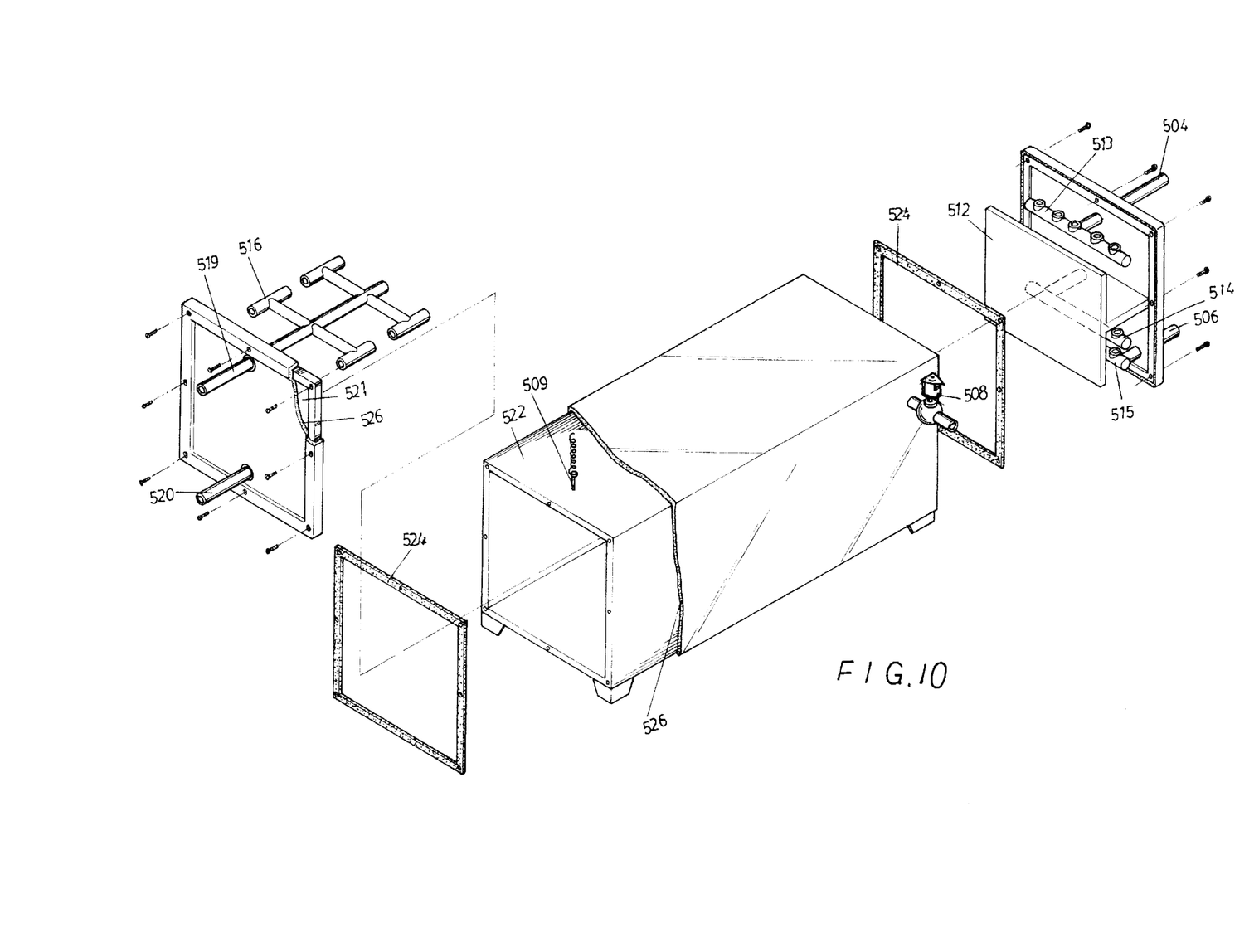
FIG. 10 is an exploded perspective of the heat storage showing the assembling thereof.

Please further refer to FIG. 10 for the structure of the heat storage 5. As shown, the heat storage 5 mainly includes a left side panel, a main body, and a right side panel.

The left side panel of the heat storage 5 further includes a plurality of hot water outlet distribution heads 516, a hot water supplying pipe 519, a water drain pipe 520, and a left cover 521. The main body further includes an exhaust valve 508, a temperature sensor 509, and a housing 522. The right side panel further includes a heat recovery hot water pipe 504, a replenished cold water pipe 506, a partition board 512, a plurality of hot water pipe distribution heads 513, a room-temperature water suction inlet 515, and a right cover 525. All the left side panel, the main body, and the right side panel are wrapped with insulation material 526 to reduce possible heat loss. Left and right gaskets 523, 524 are tightly fixed between the left side panel and the main body and between the right side panel and the main body, respectively, by means of bolts to prevent leakage.

To form the heat storage 5, first assemble all the elements to form the left side panel, the main body, and the right side panel, and then use bolts to screw these three parts together with the gaskets 523, 524 respectively mounted between the left side panel and the main body and between the right side panel and the main body. With this design, all the elements for forming the heat storage 5 can be modularized to reduce time and labor needed to assemble the heat storage 5. The heat storage 5 can therefore be manufactured in mass production to reduce manufacturing cost thereof. And, maintenance and cleaning of the heat storage 5 can be easily proceeded simply by loosening the bolts and disassembling the left and the right side panels from the main body.

The insulation material 526 wrapped over the heat storage 5 may prevent heat energy of the hot water in the heat storage 5 from dissipating in a natural way. The water drain pipe 520 is connected to a lower end of the left side panel and has a draining valve 518 mounted thereon to facilitate cleaning of the heat storage 5 during normal maintenance.

Figure 11:
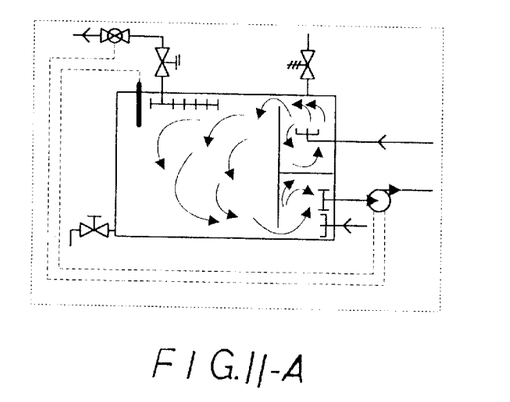
FIGS. 11A, 11B and 11C are diagrams showing the operation modes of the heat storage of the present invention.

The heat storage 5 may have different operation modes which are decided by the ON or OFF of the hot water circulation pump 505 and the hot water flow regulating valve 507. FIGS. 11A, 11B, and 11C illustrate three different operation modes of the heat storage 5 according to the present invention.

In FIG. 11A, the hot water circulation pump 505 is turned on and the hot water flow regulating valve 507 is turned off, so that hot water simply circulates in the heat storage 5.

In FIG. 11B, the hot water circulation pump 505 is turned off and the hot water flow regulating valve 507 is turned on, so that water can be replenished to push hot water in the top stratification of the thermal stratification chamber 503 of the heat storage 5 to flow out of the chamber 503 from the hot water flow regulating valve 507.

In FIG. 11C, the hot water circulation pump 505 is turned on and the hot water flow regulating valve 507 is also turned on, allowing replenished water to flow into the room-temperature mixing chamber 502 to mix with warm water in the chamber 502 and then be transferred by hot water circulation pump 505 to the heat recovery heat exchanger 7 for heating. The heated water flows from the heat recovery heat exchanger 7 into the high-temperature mixing chamber 501 and passes the upper hot water passage 510 to enter into the thermal stratification chamber 503. And, the hot water in the top stratification of the chamber 503 flows out of the chamber 503 via the hot water flow regulating valve 507.

The above three operation modes of the heat storage 5 are now described below in more details.

Please refer to FIG. 11A, when the heat pump system is first started, replenished water is fed into the high-temperature mixing chamber 501, the room-temperature mixing chamber 502, and the thermal stratification chamber 503. At this point, the hot water flow regulating valve 507 is closed. With the increased water level in the heat storage 5, air in the heat storage 5 is continuously discharged from the exhaust valve 508. The exhaust valve 508 is closed when the whole heat storage 5 is filled with water. At this point, water in the heat storage 5 is sucked by the hot water circulation pump 505 via the room-temperature water suction distribution head 515 and is then transferred to the heat recovery heat exchanger 7 in where heat exchange is done between the water and the high-pressure gaseous refrigerant to produce hot water via heat recovery. The heated water flows into the high-temperature mixing chamber 501 via hot water pipe distribution heads 513 and pushes hot water at the top of the chamber 501 to flow through the upper hot water passage 510 and into the thermal stratification chamber 503. This causes room-temperature water at the bottom of the chamber 503 to flow through the room-temperature water passage 511 and into the room-temperature mixing chamber 502. Continuous circulation of water in this way results in constant rising of water temperature in the heat storage 5. When the temperature sensor 509 near the hot water outlet detects a water temperature reaching a preset high limit, it sends a control signal to the hot water circulation pump 505 to stop the same from further operating.

In the second operation mode described in FIG. 11B, the hot water flow regulating valve 507 is opened, and replenished water is fed via cold water pipe distribution heads 514 and flows into the room-temperature mixing chamber 502 from the lower right corner of the heat storage 5. The water then flows into the bottom of the thermal stratification chamber 503 via the lower room-temperature water passage 511, and slowly pushes high-temperature water at the top stratification in the chamber 503 to flow out of the chamber 503 via hot water outlet distribution heads 516. The cold water flows into the chamber 502 at a speed the same as that at which the hot water flows out of the heat storage 5, so that the water in the heat storage 5 can always be maintained at full level.

And now, please refer to FIG. 11C. When the hot water is constantly supplied for use and the cold water is continuously replenished, water temperature in the thermal stratification chamber 503 gradually lowered. When the water temperature in the chamber 503 has become lower than the low limit preset for the temperature sensor 509, a control signal is sent to the hot water circulation pump 505 to restart the pump 505, so that replenished water and warm water in the room-temperature mixing chamber 502 is sucked by and mixed in the pump 505 via the room-temperature water suction distribution head 515. The mixed water is then transferred from the pump 505 to the heat recovery heat exchanger 7 to be further heated in the heat exchanger 7. The heated water flows from the heat recovery heat exchanger 7 into the high-temperature mixing chamber 501, and pushes hot water at the top of the chamber 501 into the thermal stratification chamber 503, causing hot water at the top stratification of the chamber 503 to flow out of the heat storage 5 for end use. Meanwhile, room-temperature water at the bottom stratification of the chamber 503 is pushed into the room-temperature mixing chamber 502. The whole cycle continues until hot water temperature in the thermal stratification chamber 503 reaches the preset high limit. This whole circulation is similar to that described in FIG. 11A.

The heat storage 5 is used as a buffer in the whole heat pump system to protect the system by avoiding frequent start and shutdown of the compressor 6. Meanwhile, the hot water supplied by the system can always be maintained within a steady temperature range.

What is claimed is:

1. A multipurpose heat pump system, comprising a heat pump unit using air as a heat source and a heat storage; said heat pump unit further including a compressor, a heat recovery heat exchanger, a four-way valve, an air-cooled heat exchanger, two inspection windows, two expansion valves, two electromagnetic valves, and a check valve, and said heat storage being formed from a left side panel, a main body and a right side panel, and said heat storage further includes a water pipeline provided with a hot water circulation pump, a plurality of hot water pipe distribution heads and cold water pipe distribution heads, a plurality of hot water outlet distribution heads, a room-temperature water suction distribution head, a high-temperature water passage, a room-temperature water passage, and a hot water flow regulating valve.

2. A multipurpose heat pump system as claimed in claim 1, wherein said heat pump unit includes a refrigerant pipeline which communicates all elements forming said heat pump unit, and refrigerant flowing in said refrigerant pipeline can be routed differently to perform different operation modes depending on actual need.

3. A multipurpose heat pump system as claimed in claim 1, wherein said heat storage is separated by a partition board into a high-temperature mixing chamber, a room-temperature mixing chamber, and a thermal stratification chamber.

4. A multipurpose heat pump system as claimed in claim 3, wherein said thermal stratification chamber is provided near a hot water outlet of said chamber with a temperature sensor for detecting temperature of hot water supplied from said thermal stratification chamber for end use.

5. A multipurpose heat pump system as claimed in claim 1, wherein said heat storage has a hot water supplying pipe connected to said hot water outlet distribution heads; a flow switch being mounted on said hot water supplying pipe to detect hot water flow inside said hot water supplying pipe; whereby when hot water flow is too low in the hot water supplying pipe, a control signal is sent to said hot water circulation pump to cause said hot water circulation pump to stop operating.

6. A multipurpose heat pump system as claimed in claim 3, wherein said heat pump unit is mounted in a housing and is communicable with said high-temperature mixing chamber and said room-temperature mixing chamber of said heat storage by means of a hot water circulation pipeline; and wherein said heat storage is wrapped with insulation material to reduce heat loss.

7. A multipurpose heat pump system as claimed in claim 5, wherein said left side panel of said heat storage includes said hot water outlet distribution heads, said hot water supplying pipe, a drain pipe, and a left side cover.

8. A multipurpose heat pump system as claimed in claim 4, wherein said main body of said heat storage includes an exhaust valve, said temperature sensor, and a housing.

9. A multipurpose heat pump system as claimed in claim 1, wherein said right side panel of said heat storage includes a replenished water pipeline, a heat recovery hot water pipeline, said partition board, said hot water pipe distribution heads, said room-temperature water suction distribution head, and a right side cover.

10. A multipurpose heat pump system as claimed in claim 1, wherein said heat storage is made of anti-corrosion metal sheet, including stainless steel sheet, and is reinforced with a plurality of welded angular steel strips.

11. A multipurpose heat pump system as claimed in claim 1, wherein said left side panel, said main body and said right side panel of said heat storage are wrapped around their outer surfaces with insulation material to reduce heat loss.

* * * * *